Figure 1:
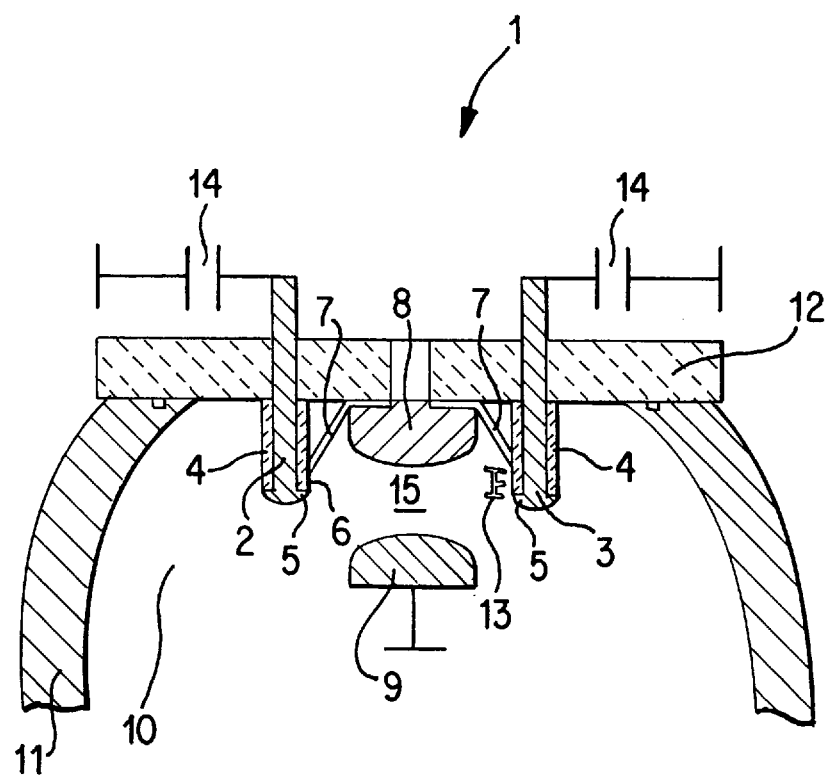

United States Patent
Osmanow

[11] Patent Number: 5,875,207
[45] Date of Patent: Feb. 23, 1999

[54] DISCHARGE ARRANGEMENT FOR PULSED GAS LASERS

[75] Inventor: Rustem Osmanow, Berlin, Germany

[73] Assignee: ATL Lasertechnik & Accessories GmbH, Berlin, Germany

[21] Appl. No.: 776,116
[22] PCT Filed: Jul. 20, 1995
[86] PCT No.: PCT/EP95/02870
  § 371 Date: Jan. 22, 1997
  § 102(e) Date: Jan. 22, 1997
[87] PCT Pub. No.: WO96/03789
  PCT Pub. Date: Feb. 8, 1996

[30] Foreign Application Priority Data

Jul. 22, 1994 [DE] Germany ............ 44 26 723.1

[51] Int. Cl.⁶ .................................................. H01S 3/097
[52] U.S. Cl. .............................................. 372/86; 372/87
[58] Field of Search ................................ 372/87, 86, 88, 372/596, 81–83

[56] References Cited

U.S. PATENT DOCUMENTS 5,042,047  8/1991  Ono et al. ............................ 372/86
5,377,215  12/1994 Das et al. ............................ 372/58

FOREIGN PATENT DOCUMENTS 502228  9/1992  European Pat. Off. .

Primary Examiner—Leon Scott, Jr.
Attorney, Agent, or Firm—Evenson, McKeown, Edwards & Lenahan P.L.L.C.

[57] ABSTRACT

The description relates to a discharge device (1) for pulsed gas lasers in which there are laser electrodes (8, 9) in the space (15) between which discharges with intense UV emission are produced by an arrangement on at least one side, by which the space (15) between the laser electrodes (8, 9) is pre-ionized. Essentially in the invention, the arrangement (2, 3, 4) includes at least one rod electrode (2) which is surrounded by an insulating, preferably ceramic, material (4) and has a conductive contact (5) with the surface (6) of the insulating ceramic material (4), and on this surface (6) there is at least one counter-electrode (7) spaced from the rod electrode (2), the counter-electrode (7) being conductively connected to one of the laser electrodes (8), so that sliding discharge tracks or paths (13) are formed between the at least one rod electrode (2) and the counter-electrode (7). This provides a discharge device (1) making the laser beam generation markedly more effective and lengthening the useful life of the components and gas filling of the laser.

9 Claims, 1 Drawing Sheet

DISCHARGE ARRANGEMENT FOR PULSED GAS LASERS

The invention relates to a discharge arrangement for pulsed gas lasers, wherein laser electrodes are disposed and a pre-ionization of the gaps between the laser electrodes is produced by means of an at least one-sided system for producing discharges of intense UV emission.

The effectiveness of gas lasers, especially TEA lasers, which operate at a pressure of >1 bar, depends on the pre-ionization of the gaseous medium, i.e., on the initial electron concentration in the discharge volume, the initial stage of the development of the discharge. For the pre-ionization of the gaps between the laser electrodes it is already known to operate with spark discharges. Such a discharge arrangement is described, for example, in the inventor's older, not previously published patent application P 43 15 973.7.

One special method of pre-ionization of a gaseous medium is the sliding discharge which has in recent years been applied as an intense UV and VUV light source (A. Baschkin, Kvantowaja Eleektronika 1976, vol. 3, No. 8, pp. 1824–26). The sliding discharge assures radiation in the UV and VUV spectral ranges up to a wavelength of $\lambda = 2$ nm at a plasma temperature in the discharge of up to $-3 \cdot 10^4$ K (Bagen B. et al., Ins. Plasma Phys. Jülich, 1963, pp. 631–34).

The sliding discharge is formed between the cathode and anode electrodes which are on the surface of the dielectric on the back of which the anode electrode is also disposed. The voltage pulse results in the development of large gradients of the voltage in the electrical field of the cathode, due to a capacity present between the electrodes. On this account a pre-ionization wave forms, which is accompanied by a glow and moves away from the cathode and permits a flashover onto the surface of the dielectric. The sliding discharge is basically far more suitable as a light source than a free spark discharge (Daniel E., Zeitschr. Techn. Phys. (Russian) 1979, vol. 49, No. 6, pp 1241–1244).

Since the plasma temperature of the sliding discharge is significantly higher than the temperature of the free spark, an optical yield approximately 10 times greater is produced. The spectrum contains more lines at the expense of the dielectric material. Moreover, in the sliding discharge the electrodes undergo a very slight erosion, which is greatly to the advantage of gas lasers operating with a high repetition at a higher repetition rate. Appropriate materials with a dielectric surface are in this case a variety of types of ceramic. Ceramics have chemical, thermal and mechanical stability as well as high breakdown resistance.

The invention is addressed to the task of creating a discharge arrangement which will permit a definitely greater effectiveness of the laser beam production and will lengthen the life of the components and of the gas filling the laser.

This task is accomplished by the invention through the features of claim 1. Since the arrangement is formed of at least one rod-like electrode which is enveloped by an insulating, preferably ceramic material, and which has a conductive contact with the surface of the insulating ceramic material, and since on this surface at least one counter-electrode is disposed at a distance from the rod-like electrode and is conductively connected to one of the laser electrodes, sliding discharges are formed between the rod-like electrode and the counter-electrode. On account of this arrangement it has become possible to utilize the advantages of a sliding discharge for the pre-ionization of the gap between the laser electrodes.

According to a preferred embodiment of the invention provision is made for making one external surface of the rod-like electrode rounded. Thus the formation of peak voltages is prevented, so that overall the rod-like electrodes can extend very effectively far into the gap between the laser electrodes without the occurrence of flashovers to the other laser electrode. Preferably, therefore, the rod-like electrode is provided with a mushroomed head.

It is furthermore advantageous if a plurality of rod-like electrodes are arranged in rows on both sides of one of the laser electrodes. Such a configuration additionally enhances the effectiveness of the pre-ionization of the gap between the laser electrodes. An additional, definite optimization can be achieved if the counter-electrode is formed by a metal plate which is in electrical contact along its entire length with one of the laser electrodes and the surface of the insulating ceramic material.

Preferably, provision is furthermore made for the high-voltage insulator to be a flat plate of ceramic material on which one of the laser electrodes is fastened. Within the framework of the invention it is also arranged that on the flat plate there are additionally fastened the counter-electrode and the rod-like electrode. The flat plate of ceramic material that can be used according to the invention is easily manufactured and, in contrast to insulators of plastic, it is also resistant to UV, so that no aging occurs.

It is furthermore advantageous if each sliding discharge line is connected to a capacitor of its own. Since the rod-like electrodes are directly coupled each with its own condenser, not only an especially effective pre-ionization is achieved but also a very high beam uniformity and pulse-to-pulse stability are achieved.

In the drawing an embodiment of the invention is represented and will now be described in detail.

In the drawing, the discharge arrangement for pulsed lasers is identified by the numeral 1. The discharge arrangement 1 has at least one rod-like metal electrode 2 whose outside surface 16 is rounded. The rod-like electrode 2 is provided in each case with a mushroom-shaped head 3. The rod-like electrode 2 is vacuum-sealed by an insulating, preferably ceramic material 4, of $Al_2O_3$, for example, and its end has a conductive contact 5 with a surface 6 of the insulating material 4. On this surface 6 there is disposed in direct contact a counter-electrode 7 of sheet metal at a distance from the rod-like electrode, which is furthermore in electrical contact over its entire length with a laser electrode 8 which here forms a cathode. An additional laser electrode 9, which forms an anode, is disposed in a discharge chamber 10 which is surrounded by a tubular wall 11. A flat plate 12 of ceramic material is disposed on the tubular wall 11 and to it are fastened the laser electrode 8, the counter-electrode 7 and the rod-like electrodes 2 disposed in rows on both sides of the laser electrode 8. Between the laser electrodes 8 and 9 is the gap 15 which is to be ionized.

Between each rod-like electrode 2 and the counter-electrode 7 sliding discharge tracks 13 form as the discharge system 1 operates. Each sliding discharge track 13 is connected by its corresponding rod-like electrode 2 to its own capacitor 14.

During the formation of a voltage pulse at the cathode, i.e., at the laser electrode 8, the capacitors 14 between the counter-electrode 7 and the rod-like electrodes 2 begin to charge. Since between the counter-electrode 7 and the mushroom head 3 of rod-like electrodes 2 there is a ceramic surface, a sliding discharge forms there on the sliding discharge track 13. The gas medium between the laser electrodes 8 and 9 becomes ionized, and when a certain voltage is reached the discharge takes place on the laser electrodes 8 and 9.

Since the sliding discharge runs very fast, the voltage rise time at the laser electrodes 8, i.e., the cathode, is short. This makes it possible to reduce the possibility of a discharge at the surface of the flat plate 12 of ceramic material acting as insulator. At the same time it is of great significance that it has become possible according to the invention to make this insulator in the form of a plate of ceramic material, from $Al_2O_3$, for example.

It is a very important detail of the invention, and in general of great significance for the technology of excimer lasers, that the necessary insulator can now be made of ceramic. Ceramic has a high chemical, thermal and mechanical stability. In general, ceramic is the best-suited material for dielectric surfaces. The described excimer laser with sliding discharge pre-ionization and an insulator of aluminum oxide ceramic was developed on the basis of an earlier-designed laser, and once again reference is made to the above-mentioned older patent application P 43 15 973.7 of the inventor.

So now a generation is produced with a wavelength of $\lambda$=193 nm (ArF), 148 nm (KrF, 308 nm (XeCl), and 351 nm (XeF) at a common gas pressure up to 8–10 bar. Surprisingly, even at a high gas pressure a very effective pre-ionization is thereby achieved, which leads to a high energy in the emitted laser pulses per $cm^3$ of excitation volume (>8 $mJ/cm^3$ at 248 nm) even at high repeat rates, and the construction of small, high-powered pulsed gas lasers is made possible. In the pulsed gas lasers known heretofore, specific laser pulse energies of only 3–4 $mJ/cm^3$ with respect to the active volume, are typical.

We claim:

1. A discharge device for a pulsed gas laser, comprising:
    a pair of laser electrodes arranged with a gap between them;
    an at least one-sided arrangement adjacent said gap for producing discharges with intense UV emissions for pre-ionizing the gap between the laser electrodes, said arrangement comprising at least one electrode rod surrounded by an insulating material and having a conductive contact with a surface of the insulating material, and
    at least one counter-electrode disposed on the surface of the insulating material spaced a distance from the electrode rod, said counter-electrode being conductively connected to one of the laser electrodes;
    the at least one electrode rod, the surrounding insulating material, and the at least one counter-electrode forming a path for a sliding discharge between the at least one electrode rod and the counter-electrode for pre-ionizing the gap between the laser electrodes.

2. A discharge device according to claim 1, wherein the electrode rod has a rounded external surface.

3. A discharge device according to claim 1, wherein the electrode rod is provided with a mushroom-shaped head.

4. A discharge device according to claim 1, wherein a plurality of electrode rods are arranged in rows on both sides of one of the laser electrodes.

5. A discharge device according to claim 1, wherein the counter-electrode comprises a metal plate which is in electrical contact over its entire length with one of the laser electrodes and with the surface of the insulating material.

6. A discharge device according to claim 1, wherein one of the laser electrodes is mounted on a high-voltage insulator comprising a flat plate.

7. A discharge device according to claim 1, wherein one of the laser electrodes, the counter-electrode and the at least one electrode rod are mounted on a high-voltage insulator comprising a flat plate.

8. A discharge device according to claim 1, wherein each electrode rod which forms the sliding discharge track, is connected to a respective, individual capacitor.

9. A discharge arrangement according to claim 1, wherein said insulating material is a ceramic material.

* * * * *